United States Patent
Walker et al.

(10) Patent No.: US 10,619,741 B2
(45) Date of Patent: Apr. 14, 2020

(54) CONTACTING DRY FACE SEAL WITH TAPERED CARBON NOSE

(71) Applicant: United Technologies Corporation, Farmington, CT (US)

(72) Inventors: Brady Walker, Glastonbury, CT (US); Robert D. Szolomayer, Marlborough, CT (US)

(73) Assignee: United Technologies Corporation, Farmington, CT (US)

( * ) Notice: Subject to any disclaimer, the term of this patent is extended or adjusted under 35 U.S.C. 154(b) by 0 days.

(21) Appl. No.: 15/701,506

(22) Filed: Sep. 12, 2017

(65) Prior Publication Data
US 2019/0078688 A1 Mar. 14, 2019

(51) Int. Cl.
| | |
|---|---|
| *F01D 11/00* | (2006.01) |
| *F16J 15/34* | (2006.01) |
| *F16J 15/16* | (2006.01) |
| *F01D 25/18* | (2006.01) |
| *F16J 15/30* | (2006.01) |

(52) U.S. Cl.
CPC .......... *F16J 15/164* (2013.01); *F01D 11/003* (2013.01); *F01D 25/183* (2013.01); *F16J 15/30* (2013.01); *F16J 15/3404* (2013.01); *F16J 15/3408* (2013.01); *F16J 15/3452* (2013.01); *F05D 2240/55* (2013.01); *F05D 2250/232* (2013.01); *F05D 2250/292* (2013.01); *F05D 2260/38* (2013.01); *F16J 15/34* (2013.01)

(58) Field of Classification Search
CPC .................................. F16J 15/164; F16J 15/34
See application file for complete search history.

(56) References Cited

U.S. PATENT DOCUMENTS

| | | | | |
|---|---|---|---|---|
| 3,392,984 A | * | 7/1968 | Reinsma | B62D 55/0887 277/380 |
| 3,592,479 A | | 7/1971 | Andresen | |
| 3,743,303 A | * | 7/1973 | Pope | F01D 11/00 277/422 |
| 3,770,284 A | * | 11/1973 | Galloway | F16J 15/3456 277/380 |
| 3,784,213 A | * | 1/1974 | Voitik | F16J 15/348 277/373 |
| 3,905,605 A | * | 9/1975 | Hubner | F16J 15/3404 277/360 |
| 4,150,834 A | | 4/1979 | Robert | |
| 5,014,999 A | | 5/1991 | Makhobey | |

(Continued)

FOREIGN PATENT DOCUMENTS

| | | |
|---|---|---|
| JP | 3552033 | 8/2004 |
| JP | 2010216489 | 9/2010 |

OTHER PUBLICATIONS

European Search Report for Application No. 18194105.5, dated Feb. 12, 2019.

*Primary Examiner* — Gilbert Y Lee
(74) *Attorney, Agent, or Firm* — Carlson, Gaskey & Olds, P.C.

(57) ABSTRACT

A face seal assembly for a gas turbine engine includes a seal body having a seal face defining a contact area disposed between tapered sides. The seal body defines an axial width between a back surface of the seal body and the seal face. A decrease in the axial width from wear increases the contact area. A bearing assembly and method are also disclosed.

17 Claims, 3 Drawing Sheets

(56) References Cited

U.S. PATENT DOCUMENTS

| | | |
|---|---|---|
| 5,490,679 A | 2/1996 | Borrino et al. |
| 7,984,911 B2 | 7/2011 | Dobek et al. |
| 8,714,557 B2 | 5/2014 | Miller et al. |
| 9,239,117 B1 | 1/2016 | Craig et al. |
| 9,383,017 B2 | 7/2016 | Young et al. |
| 9,383,019 B2 | 7/2016 | Takahashi |
| 2011/0223003 A1 | 9/2011 | Olennikov |
| 2014/0035233 A1* | 2/2014 | Takahashi ............ F16J 15/3488 277/361 |
| 2016/0010477 A1 | 1/2016 | Maret |
| 2018/0073394 A1* | 3/2018 | Tokunaga ............... F01D 25/16 |

* cited by examiner

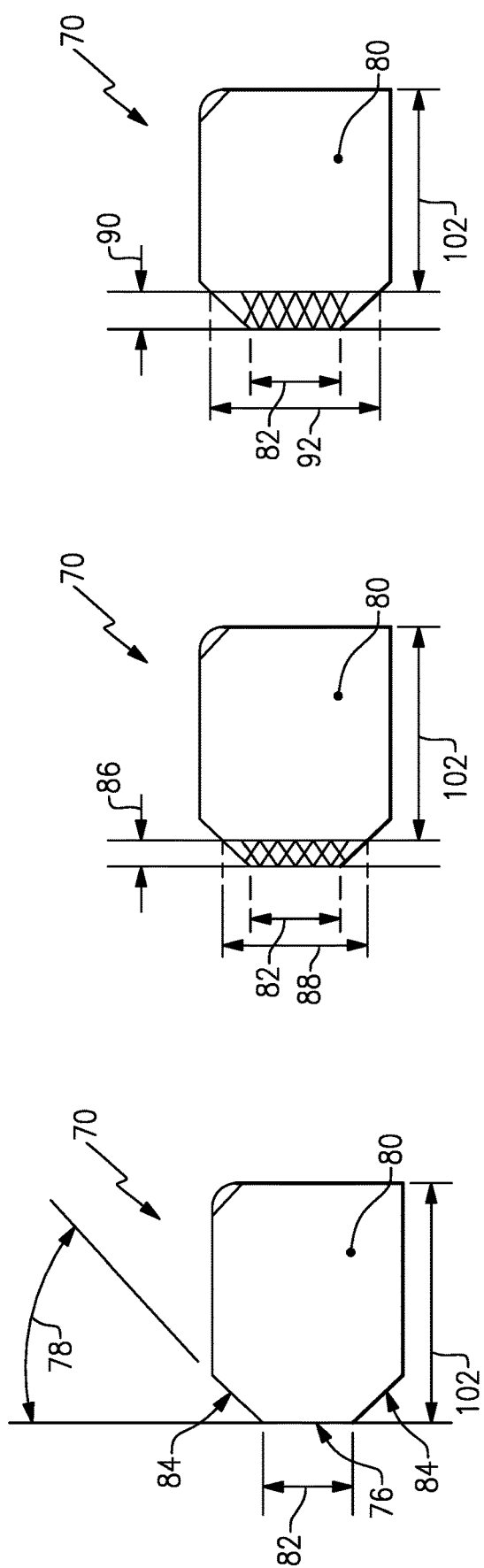

CONTACTING DRY FACE SEAL WITH TAPERED CARBON NOSE

BACKGROUND

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section. The compressor section typically includes low and high pressure compressors, and the turbine section includes low and high pressure turbines.

Shafts coupled between the turbine and compressor sections are supported on bearings disposed within bearing compartments. The bearing compartments are isolated from high pressure and temperature regions within the engine. To maintain the environment within a bearing compartment a seal between a static and rotating part is required. Seals are typically biased against a rotating face at a defined pressure to provide the desired seal. Such seals can wear prematurely if pressures increase during wear and operation.

Turbine engine manufacturers continue to seek improvements to engine performance including improvements to part life, engine assembly, maintenance and thermal, transfer and propulsive efficiencies.

SUMMARY

In a featured embodiment, a face seal assembly for a gas turbine engine includes a seal body having a seal face defining a contact area disposed between tapered sides. The seal body defines an axial width between a back surface of the seal body and the seal face. A decrease in the axial width from wear increases the contact area.

In another embodiment according to the previous embodiment, tapered sides are disposed at an angle relative to the seal face between 30 and 60 degrees.

In another embodiment according to any of the previous embodiments, the seal body is annular about an axis and the seal face includes an annular contact surface engaging a rotating surface.

In another embodiment according to any of the previous embodiments, the face seal includes a radial width that is less than a radial width of the seal body.

In another embodiment according to any of the previous embodiments, a cross-sectional area of the face seal increases in a direction toward the back surface of the seal body.

In another embodiment according to any of the previous embodiments, the face seal is centered between an inner diameter and an outer diameter of the seal body.

In another embodiment according to any of the previous embodiments, the face seal is carbon.

In another featured embodiment, a bearing assembly for a gas turbine engine includes a bearing supporting a rotating part relative to fixed part. A rotating face is supported for rotation with the rotating part. A seal body has a seal face defining a contact area disposed between tapered sides. The seal body defines an axial width between a back surface of the seal body and the seal face. A biasing member biases the seal body against the rotating face generating a defined seal pressure between the rotating face and the seal body. A decrease in the axial width from wear increases an area of the seal face and decreases the seal pressure.

In another embodiment according to any of the previous embodiments, tapered sides are disposed at an angle relative to the seal face between 30 and 60 degrees.

In another embodiment according to any of the previous embodiments, the seal body is annular about an axis and the seal face includes an annular contact surface engaging a rotating surface.

In another embodiment according to any of the previous embodiments, the face seal includes a radial width that is less than a radial width of the seal body.

In another embodiment according to any of the previous embodiments, a cross-sectional area of the face seal increases in a direction toward the back surface of the seal body.

In another embodiment according to any of the previous embodiments, the face seal is centered between an inner diameter and an outer diameter of the seal body.

In another embodiment according to any of the previous embodiments, the face seal is carbon.

In another featured embodiment, a method of forming a seal between a static and rotating part of a gas turbine engine includes supporting a rotating face on a rotating part. A seal body is supported on a static structure. The seal body has a seal face defining a contact area disposed between tapered sides. The seal body defines an axial width between a back surface of the seal body and the seal face. A defined seal pressure is generated between the rotating face and the seal body with a biasing member. A decrease in the axial width from wear increases an area of the seal face and decreases the generated seal pressure.

In another embodiment according to any of the previous embodiments, the tapered sides are disposed at an angle relative to the seal face between 30 and 60 degrees.

In another embodiment according to any of the previous embodiments, a cross-sectional area of the face seal increases in a direction toward the back surface of the seal body and provides the decreased seal pressure.

In another embodiment according to any of the previous embodiments, the face seal is carbon.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

FIG. 3 is a cross-sectional view of an example face seal.

FIG. 4 is a front view of a portion of the example face seal.

FIG. 5 is a perspective view of a portion of the example face seal.

FIG. 6 is a front view of the example face seal.

FIG. 7 is a side view of the example face seal.

FIG. 8 is a side view of a portion of the example face seal in a worn condition.

FIG. 9 is a schematic view of the example face seal in a further worn condition.

DETAILED DESCRIPTION

Figure 1:
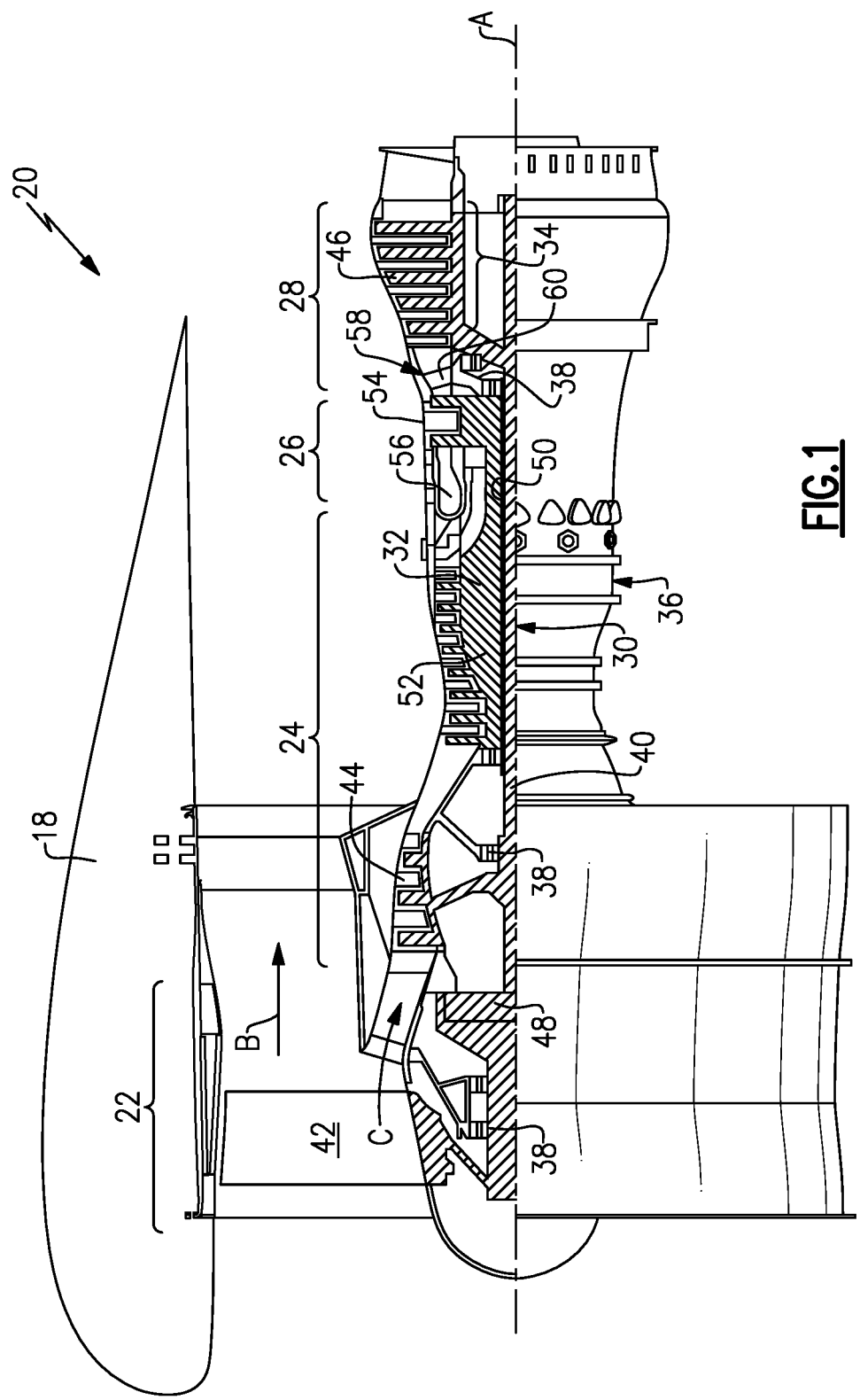
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 18, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 58 of the engine static structure 36 is arranged generally between the high pressure turbine 54 and the low pressure turbine 46. The mid-turbine frame 58 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 58 includes airfoils 60 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle.

The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans, turbine engines utilized for power generation as well as turbine engines utilized for land based vehicles and sea-going vessels.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFCT')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } ° \text{ R})/(518.7° \text{ R})]^{0.5}$. The "Low corrected fan tip speed" as disclosed herein according to one non-limiting embodiment is less than about 1150 ft/second (350.5 meters/second).

The example gas turbine engine includes the fan 42 that comprises in one non-limiting embodiment less than about twenty-six (26) fan blades. In another non-limiting embodiment, the fan section 22 includes less than about twenty (20) fan blades. Moreover, in one disclosed embodiment the low pressure turbine 46 includes no more than about six (6) turbine rotors schematically indicated at 34. In another non-limiting example embodiment the low pressure turbine 46 includes about three (3) turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Figure 2:
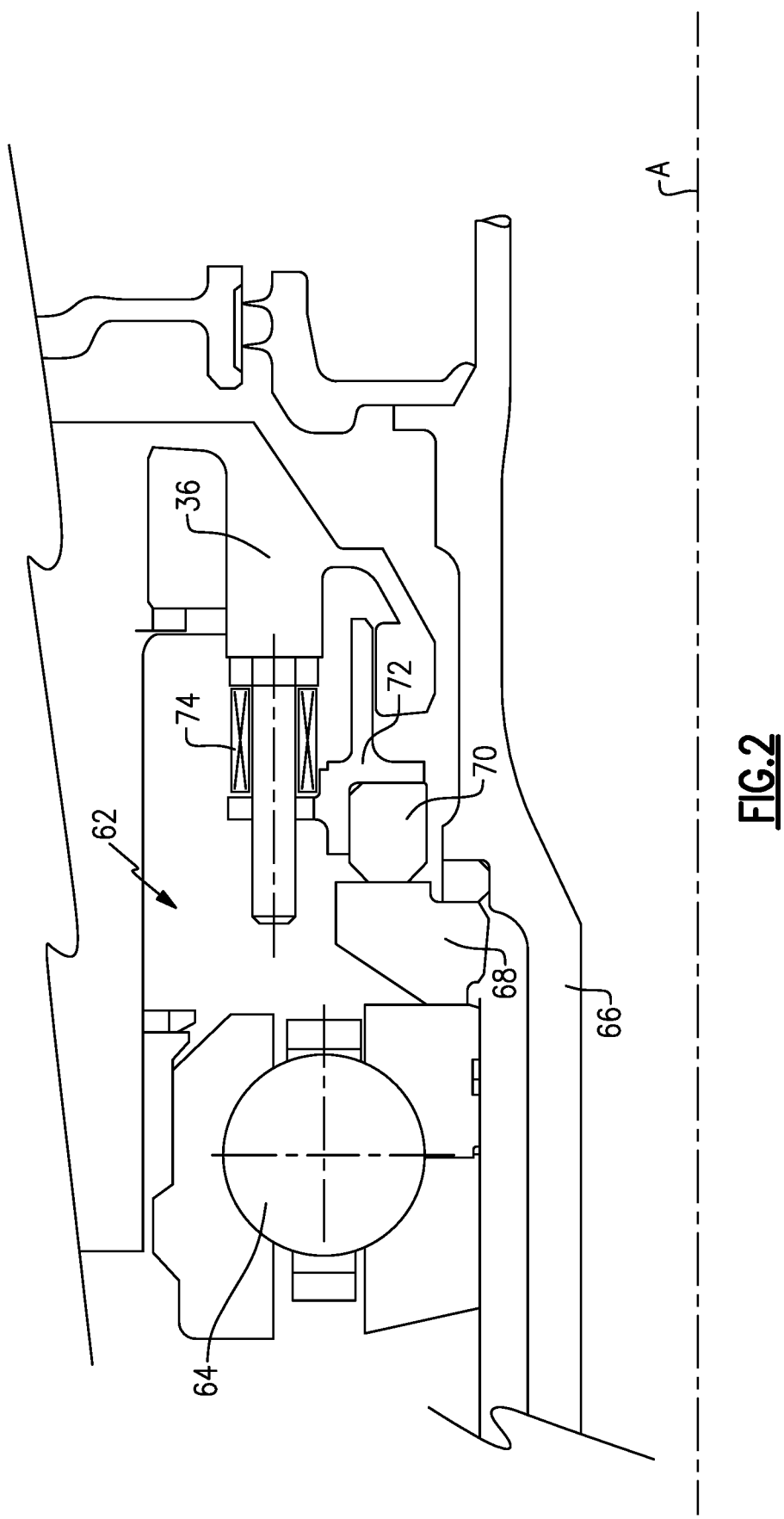
FIG. 2 is a schematic view of a bearing compartment for a gas turbine engine.

Referring to FIG. 2, an example bearing compartment 62 is schematically shown and includes bearings 64 supporting rotation of a shaft 66. The shaft 66 is an example of one of the inner shaft 40 and outer shaft 50 and may also be any other rotating shaft utilized within a gas turbine engine. A rotating face 68 is attached to the shaft 66 and includes an axially aft facing radial surface. A static seal 70 is supported on a holder 72 and biased against the face 68 by a biasing member 74. The seal 70 is supported on a static structure of the gas turbine engine 36. The rotating face 68 is supported on the rotating shaft 66 such that it rotates relative to the fixed seal 70.

The seal 70 is formed from a carbon material and provides sealing of the bearing compartment 62 against the environment surrounding the bearing compartment 62. The biasing member 74 exerts a force on the holder 72 and thereby the seal 70 is forced against the rotating face 68 at a desired pressure. The pressure between the seal 70 and the rotating face 68 is within a desired range that provides the desired sealing properties between the static seal 70 and the rotating face 68 while also providing a desired life span of the seal 70.

The seal 70 is formed from carbon and provides a dry face seal that wears at a predictable rate during operation of the engine. The contact pressure applied between the seal 70 and the rotating face 68 may change as the seal 70 wears during operation of the engine. Increases in contact pressure can result in an accelerated wear of the seal 70 such that the seal 70 may not reach the predicted operational lifespan.

Referring to FIG. 3 with continued reference to FIG. 2, the example seal 70 includes a seal face 76 that is disposed between tapered edges 84. The tapered edges 84 are disposed at an angle 78 relative to the seal face 76. The seal face 76 includes a radial width 82. The radial width 82 increases as the seal face 76 wears away. An axial width 102 of the seal 70 decreases with wear of the seal face 76. Because the tapered edges 84 are angled outward, reduction in the axial width 102 of the seal 70 results in the radial width 82 of the seal face increasing. The increased width provides an increased contact area that increases based on the angle 78 with wear resulting in reduction of the axial width 102.

Referring to FIGS. 4 and 5, the example seal 70 is shown to include the seal face 76 and tapered sides 84. In one disclosed example, the angle 78 of the tapered sides are between 30 and 60 degrees. In another example embodiment, the tapered sides 84 are disposed at an angle of 45 degrees.

Referring to FIGS. 6 and 7, the example seal 70 is shown in a front view where the seal face 76 and the tapered edges 84 are shown. The seal 70 is a one piece annular part that is disposed about the engine axis within the bearing compartment and biased against the rotating face 68. The seal 70 therefore includes an outer diameter 94 and an inner diameter 96 that correspond with the size and structure of the bearing compartment 62 and rotating face 68. The seal face 76 is disposed between an inner diameter 100 and an outer diameter 98 that correspond with a location of the rotating face 68 within the bearing compartment 62. The rotating face 66 is provided with a radial width that corresponds with the seal face 76 and with subsequent widths 82 of the seal face 76 that are encountered during wear of the seal 70.

Referring to FIG. 8, the example seal 70 is shown in a first wear condition where the axial width 102 has been reduced by an axial length 86. The length 86 results in the radial width 82 expanding to the radial width illustrated at 88. FIG. 8 illustrates the worn away portions as cross-hatching. The cross-hatching indicates that this material has worn away and the resulting seal face 76 is now increased to the width 88 that is greater than the width 82 as originally provided by the seal 70. An increase in the radial width indicated at 88 provides a corresponding increase in contact area for the face seal 76. The increase in contact area in conjunction with the corresponding uniform biasing force provided by the biasing member 74 results in an overall decrease in pressure between the face seal 76 and rotating seal 68. The reduction in pressure on the seal 70 slows wear such that the lifespan of the seal 70 is maintained within a desired and predictable range.

Referring to FIG. 9 with continued reference to FIGS. 8 and 3, further wear is illustrated and shown by way of example with a further increased width 90 of wear indicated by cross-hatching. The width 102 of the seal 70 has been further reduced by the amount indicated at 90. This further increased wear results in the face seal 76 including a contact area 92. The contact area provided by the radial width 92 is larger than the radial width 82 such that the contact area between the face seal 76 and the rotating face 68 is further increased. The further increased contact area results in a further reduction in the overall pressure exerted between the seal 70 and the rotating face 68. The reduction in pressure between the seal 70 and the rotating face 68 reduces the progression of wear on the seal 70 thereby increasing the operational life of the seal 70.

Accordingly, the example seal 70 includes a geometry that provides for an increasing contact area that reduces pressure at the seal interface to extend the operational life of the seal 70.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A face seal assembly for a gas turbine engine comprising:
   a seal body having a seal face defining a contact area disposed between tapered sides, the seal body defining an axial width between a back surface of the seal body and the seal face, wherein the seal face is centered between identical tapered sides, wherein one of the tapered sides begins at an inner diameter of the seal body and extends to the seal face and another of the tapered sides begins at an outer diameter and extends to the seal face; wherein a decrease in the axial width from wear increases the contact area.

2. The face seal assembly as recited in claim 1, wherein tapered sides are disposed at an angle relative to the seal face between 30 and 60 degrees.

3. The face seal assembly as recited in claim 1, wherein the seal body is one piece annular part that extends completely about an axis and the seal face comprises an annular contact surface engaging a rotating surface.

4. The face seal assembly as recited in claim 3, wherein the face seal includes a radial width that is less than a radial width of the seal body.

5. The face seal assembly as recited in claim 4, wherein a cross-sectional area of the face seal increases in a direction toward the back surface of the seal body.

6. The face seal assembly as recited in claim 3, wherein the face seal is centered between an inner diameter and an outer diameter of the seal body.

7. The face seal assembly as recited in claim 1, wherein the face seal is carbon.

8. A bearing assembly for a gas turbine engine comprising:
   a bearing supporting a rotating part relative to fixed part;
   a rotating face supported for rotation with the rotating part;
   a seal body having a seal face defining a contact area disposed between tapered sides, the seal body defining an axial width between a back surface of the seal body and the seal face wherein the seal face is centered between identical tapered sides, wherein one of the tapered sides begins at an inner diameter of the seal body and extends to the seal face and another of the tapered sides begins at an outer diameter and extends to the seal face; and a biasing member biasing the seal body against the rotating face generating a defined seal pressure between the rotating face and the seal body, wherein a decrease in the axial width from wear increases an area of the seal face and decreases the seal pressure.

9. The bearing assembly as recited in claim 8, wherein the tapered sides are disposed at an angle relative to the seal face between 30 and 60 degrees.

10. The bearing assembly as recited in claim 9, wherein the seal body is annular about an axis and the seal face comprises an annular contact surface engaging a rotating surface.

11. The bearing assembly as recited in claim 10, wherein the face seal includes a radial width that is less than a radial width of the seal body.

12. The bearing assembly as recited in claim 8, wherein a cross-sectional area of the face seal increases in a direction toward the back surface of the seal body.

13. The bearing assembly as recited in claim 8, wherein the face seal is carbon.

14. A method of forming a seal between a static and rotating part of a gas turbine engine comprising:

supporting a rotating face on a rotating part;

supporting a seal body on a static structure, wherein the seal body has a seal face defining a contact area disposed between tapered sides, the seal body defining an axial width between a back surface of the seal body and the seal face, wherein the seal face is centered between identical tapered sides, wherein one of the tapered sides begins at an inner diameter of the seal body and extends to the seal face and another of the tapered sides begins at an outer diameter and extends to the seal face; and generating a defined seal pressure between the rotating face and the seal body with a biasing member, wherein a decrease in the axial width from wear increases an area of the seal face and decreases the generated seal pressure.

15. The method as recited in claim 14, wherein the tapered sides are disposed at an angle relative to the seal face between 30 and 60 degrees.

16. The method as recited in claim 15, wherein a cross-sectional area of the face seal increases in a direction toward the back surface of the seal body and provides the decreased seal pressure.

17. The method as recited in claim 14, wherein the face seal is carbon.

* * * * *